(12) United States Patent
Geng et al.

(10) Patent No.: US 11,889,310 B2
(45) Date of Patent: Jan. 30, 2024

(54) COMMUNICATION METHOD AND COMMUNICATION APPARATUS

(71) Applicant: HUAWEI TECHNOLOGIES CO., LTD., Guangdong (CN)

(72) Inventors: Tingting Geng, Shanghai (CN); Yedan Wu, Shanghai (CN); Le Yan, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 39 days.

(21) Appl. No.: 17/706,357

(22) Filed: Mar. 28, 2022

(65) Prior Publication Data

US 2022/0217538 A1 Jul. 7, 2022

Related U.S. Application Data

(63) Continuation of application No. PCT/CN2019/109183, filed on Sep. 29, 2019.

(51) Int. Cl.
*H04W 12/06* (2021.01)
*H04W 76/27* (2018.01)
*H04W 12/08* (2021.01)

(52) U.S. Cl.
CPC ........... *H04W 12/08* (2013.01); *H04W 76/27* (2018.02)

(58) Field of Classification Search
CPC ..... H04W 12/08; H04W 76/27; H04W 12/06; H04W 12/73; H04W 76/16; H04W 40/34; H04W 84/06; H04W 76/19; H04W 76/20
See application file for complete search history.

(56) References Cited

U.S. PATENT DOCUMENTS

| 9,660,804 B2 * | 5/2017 | Liu | ...................... H04L 9/083 |
| 10,965,655 B2 * | 3/2021 | Huang | ...................... H04L 9/14 |

(Continued)

FOREIGN PATENT DOCUMENTS

| CN | 101060712 A | * | 8/2011 | ............ H04W 88/02 |
| CN | 108260171 A | | 7/2018 | |

(Continued)

OTHER PUBLICATIONS

PCT International Search Report and Written Opinion issued in International Application No. PCT/CN2019/109183 dated Jun. 29, 2020, 16 pages (with English translation).

(Continued)

*Primary Examiner* — Andrew Wendell
(74) *Attorney, Agent, or Firm* — Fish & Richardson P.C.

(57) ABSTRACT

The disclosure provides communication methods and apparatuses. One example method including a first access network device sends a first message to a terminal device and a second message to a core network device. The first message is used to indicate the terminal device to enter an inactive state. The second message carries context information and a first security verification parameter of the terminal device, and the first security verification parameter is used to perform security verification on the terminal device. The first access network device receives a third message from a second access network device, where the third message is used to request the context information of the terminal device. The first access network device sends a fourth message to the second access network device, where the fourth message is used to indicate the first access network device not to provide the second access network device with the context information.

13 Claims, 6 Drawing Sheets

(56) References Cited

U.S. PATENT DOCUMENTS

| | | | |
|---|---|---|---|
| 11,153,792 B2* | 10/2021 | Ozturk | H04W 8/08 |
| 2013/0083691 A1* | 4/2013 | Murphy | H04L 41/0809 |
| | | | 370/254 |
| 2016/0286043 A1* | 9/2016 | John | H04W 4/02 |
| 2018/0227872 A1* | 8/2018 | Li | H04W 76/20 |
| 2019/0174365 A1 | 6/2019 | Li et al. | |
| 2019/0289570 A1* | 9/2019 | Kim | H04W 68/005 |
| 2019/0320316 A1* | 10/2019 | Mildh | H04W 76/27 |
| 2020/0021993 A1* | 1/2020 | Yang | H04W 72/23 |
| 2020/0092932 A1* | 3/2020 | Youn | H04W 76/20 |
| 2020/0163009 A1 | 5/2020 | Chen et al. | |
| 2020/0396598 A1* | 12/2020 | Guo | H04W 12/08 |
| 2021/0195678 A1* | 6/2021 | Jin | H04W 76/19 |
| 2021/0211960 A1* | 7/2021 | Ryu | H04W 36/0011 |
| 2022/0095260 A1* | 3/2022 | Shan | H04W 60/04 |
| 2022/0360980 A1* | 11/2022 | Ben Henda | H04W 36/0038 |

FOREIGN PATENT DOCUMENTS

| | | | | |
|---|---|---|---|---|
| CN | 108307389 A | * | 7/2018 | H04W 12/04 |
| CN | 109803258 A | | 5/2019 | |
| CN | 109906663 A | | 6/2019 | |
| CN | 109936861 A | | 6/2019 | |
| CN | 110149630 A | | 8/2019 | |
| CN | 110167110 A | | 8/2019 | |
| CN | 110225600 A | | 9/2019 | |
| EP | 3751954 A1 | | 12/2020 | |
| WO | 2018081956 A1 | | 5/2018 | |
| WO | 2018121218 A1 | | 7/2018 | |
| WO | 2018206629 A1 | | 11/2018 | |
| WO | 2019158026 A1 | | 8/2019 | |

OTHER PUBLICATIONS

ZTE, Sanechips, "Discussion on Tracking Area Management in NTN," 3GPP TSG-RAN WG3 #101bis, R3-185610, Chengdu, China, Oct. 8-12, 2018, 6 pages.

Extended European Search Report issued in European Application No. 19947380.2 dated Aug. 12, 2022, 9 pages.

Office Action in Chinese Appln. No. 201980098712.2, dated Apr. 15, 2023, 12 pages.

* cited by examiner

COMMUNICATION METHOD AND COMMUNICATION APPARATUS

CROSS-REFERENCE TO RELATED APPLICATIONS

This application is a continuation of International Application No. PCT/CN2019/109183, filed on Sep. 29, 2019, the disclosure of which is hereby incorporated by reference in its entirety.

TECHNICAL FIELD

This application relates to the communication field, and in particular, to a communication method and a communication apparatus in the communication field.

BACKGROUND

A radio resource control (RRC) status of a terminal device includes a connected state (RRC_CONNECTED), an inactive state (RRC_INACTIVE), and an idle state (RRC_IDLE). When a terminal device is in the connected state, the terminal device has established links with an access network device and a core network device. When data arrives at a network, the core network device and the access network device may directly transmit the data to the terminal device. When a terminal device is in the inactive state, it indicates that the terminal device has previously established links with an access network device and a core network device, but the link between the terminal device and the access network device is released. Although the link is released, the access network device needs to store a context of the terminal device. When data needs to be transmitted, the access network device may quickly resume the released link based on the context of the terminal device. When a terminal device is in the idle state, there is no link between the terminal device and an access network device or between the terminal device and a core network device. When data needs to be transmitted, a link between the terminal device and the access network device and a link between the terminal device and the core network device need to be established.

It can be learned from the foregoing that, the inactive state can change by using an RRC connection release message only when a terminal device is in the connected state. When the terminal device is released from the connected state to the inactive state, an access network device (which may be referred to as an anchor access network device or a source access network device) that serves the terminal device stores a context of the terminal device, and allocates an identifier to the terminal device, to identify the stored context of the terminal device. When subsequently initiating an RRC connection resume procedure, the terminal device needs to carry the identifier and send the identifier to an access network device (which may be referred to as a target access network device) that currently serves the terminal device, to obtain the context of the terminal device. Because the terminal device has mobility, the target access network device and the anchor access network device are usually different devices, and the target access network device needs to obtain the context of the terminal device from the anchor access network device based on the identifier.

It is considered that in some scenarios (for example, a non-terrestrial network (NTN)), a movement speed of the access network device is fast. For example, the terminal device needs to change a serving cell (in other words, change the target access network device) every 1 minute to 2 minutes. However, the context of the terminal device is stored only in the anchor access network device. If the terminal device in the inactive state requests to resume an RRC connection, it is difficult for the target access network device to find the anchor access network device to obtain the context information of the terminal device from the anchor access network device. Therefore, how to ensure running of a connection resume mechanism of the terminal device becomes an urgent problem to be resolved.

SUMMARY

This application provides a communication method and a communication apparatus, to ensure running of a connection resume mechanism of a terminal device, and reduce impact of mobility of an access network device on a connection resume procedure of the terminal device, thereby improving system performance.

According to a first aspect, a communication method is provided, and includes: A first access network device sends a first message to a terminal device, where the first message is used to indicate the terminal device to enter an inactive state. The first access network device sends a second message to a core network device, where the second message carries context information and a first security verification parameter of the terminal device, and the first security verification parameter is used to perform security verification on the terminal device. The first access network device receives a third message from a second access network device, where the third message is used to request the context information of the terminal device. The first access network device sends a fourth message to the second access network device, where the fourth message indicates the first access network device not to provide the second access network device with the context information.

According to the communication method in this embodiment of this application, the first access network device sends the core network device the context information of the terminal device and a security verification parameter used to verify the terminal device. In this way, the second access network device may obtain the context information of the terminal device from the core network device, so as to resume a connection between the terminal device and the second access network device, avoid a case in which the connection cannot be resumed when the second access network device cannot find the first access network device or the first access network device does not provide the context information of the terminal device, ensure running of a connection resume mechanism of the terminal device, and reduce impact of mobility of an access network device on a connection resume procedure of the terminal device, thereby improving system performance.

The context information of the terminal device may also be referred to as a context of the terminal device or context data of the terminal device. The context information of the terminal device may include information such as a protocol data unit (PDU) session context, a security key, a wireless capability of the terminal device, and a security capability of the terminal device.

With reference to the first aspect, in some implementations of the first aspect, the fourth message is further used to indicate identification information of the core network device.

With reference to the first aspect, in some implementations of the first aspect, the first access network device stores the context information of the terminal device, and the method further includes: The first access network device performs security verification on the terminal device based on the first security verification parameter. That the first access network device sends a fourth message to the second access network device based on the third message includes: When the security verification succeeds, if the first access network device determines not to provide the second access network device with the context information, the first access network device sends the fourth message to the second access network device.

For example, the third message may carry a reason why the terminal device requests to resume the connection. The first access network device may determine, based on the reason why the terminal device requests to resume the connection, whether to provide the second access network device with the context information of the terminal device. The reason for requesting to resume the connection may be, for example, any one of a reason triggered by a radio access network notification area update (RAN notification area update, RNAU) or a reason triggered by another active or passive service. This is not limited in this embodiment of this application.

With reference to the first aspect, in some implementations of the first aspect, the third message carries a second security verification parameter of the terminal device, the second security verification parameter is used to perform security verification on the terminal device, and the method further includes: The first access network device sends a fifth message to the core network device, where the fifth message carries the second security verification parameter, to update a security verification parameter stored in the core network device.

When the first access network device successfully performs security verification on the terminal device, but determines not to provide the context information of the terminal device, the first access network device needs to update the stored security verification parameter, and update the security verification parameter for the core network device. That is, the core network device needs to update the security verification parameter from the first security verification parameter to the second security verification parameter, so as to perform security verification on the terminal device next time. Therefore, the second security verification parameter needs to be carried in the third message. The second access network device sends the third message to the first access network device, and then the first access network device sends the third message to the core network device by using the fifth message.

In this way, the core network device may obtain a latest security verification parameter, so as to perform security verification on the terminal device next time, thereby ensuring that security verification parameters stored in the terminal device and the core network device are consistent and avoiding a security verification failure. Therefore, the running of the connection resume mechanism of the terminal device can be ensured, the impact of the mobility of the access network device on the connection resume procedure of the terminal device is reduced, and the system performance is improved.

With reference to the first aspect, in some implementations of the first aspect, the second security verification parameter includes a second cell radio network temporary identifier C-RNTI allocated by the second access network device to the terminal device and a second physical cell identifier PCI of a cell of the second access network device in which the terminal device is located.

With reference to the first aspect, in some implementations of the first aspect, after the first access network device sends a second message to a core network device, the method further includes: The first access network device deletes the context information of the terminal device.

With reference to the first aspect, in some implementations of the first aspect, the first security verification parameter includes a first C-RNTI allocated by the first access network device to the terminal device and a first PCI of a cell of the first access network device in which the terminal device is located.

According to a second aspect, another communication method is provided, and includes: A core network device receives a second message from a first access network device, where the second message carries context information and a first security verification parameter of a terminal device, and the first security verification parameter is used to perform security verification on the terminal device. The core network device stores the context information and the first security verification parameter.

With reference to the second aspect, in some implementations of the second aspect, the method further includes. The core network device receives a sixth message from a second access network device, where the sixth message is used to request the context information of the terminal device. The core network device performs security verification on the terminal device based on the first security verification parameter. When the security verification succeeds, the core network device sends a seventh message to the second access network device, where the seventh message carries the context information, or the seventh message indicates the core network device not to provide the second access network device with the context information.

With reference to the second aspect, in some implementations of the second aspect, the sixth message carries a second security verification parameter of the terminal device, and the second security verification parameter is used to perform security verification on the terminal device. The method further includes: The core network device updates a security verification parameter from the first security verification parameter to the second security verification parameter.

With reference to the second aspect, in some implementations of the second aspect, the second security verification parameter includes a second cell radio network temporary identifier C-RNTI allocated by the second access network device to the terminal device and a second physical cell identifier PCI of a cell of the second access network device in which the terminal device is located.

With reference to the second aspect, in some implementations of the second aspect, when the core network device sends the context information to the second access network device, the method further includes: The core network device deletes the context information of the terminal device.

With reference to the second aspect, in some implementations of the second aspect, the first security verification parameter includes a first C-RNTI allocated by the first access network device to the terminal device and a first PCI of a cell of the first access network device in which the terminal device is located.

According to a third aspect, another communication method is provided, and includes: A second access network device receives an eighth message from a terminal device, where the eighth message is used to request to resume a connection. The second access network device sends a sixth message to a core network device, where the sixth message is used to request context information of the terminal device. The second access network device receives a seventh message from the core network device, where the seventh message carries the context information, or the seventh message indicates the core network device not to provide the second access network device with the context information.

With reference to the third aspect, in some implementations of the third aspect, before the second access network device sends a sixth message to a core network device, the method further includes: The second access network device sends a third message to a first access network device based on the eighth message, where the third message is used to request the context information of the terminal device. The second access network device receives a fourth message from the first access network device, where the fourth message indicates the first access network device not to provide the second access network device with the context information, and the fourth message further indicates identification information of the core network device. That the second access network device sends a sixth message to a core network device includes: The second access network device sends the sixth message to the core network device based on the identification information of the core network device.

With reference to the third aspect, in some implementations of the third aspect, the fifth message carries a second security verification parameter of the terminal device, to enable the core network device to update a security verification parameter from a first security verification parameter to the second security verification parameter, and the second security verification parameter is used to perform security verification on the terminal device.

With reference to the third aspect, in some implementations of the third aspect, the first security verification parameter includes a first cell radio network temporary identifier C-RNTI allocated by the first access network device to the terminal device and a first physical cell identifier PCI of a cell of the first access network device in which the terminal device is located. The second security verification parameter includes a second C-RNTI allocated by the second access network device to the terminal device and a second PCI of a cell of the second access network device in which the terminal device is located.

According to a fourth aspect, a communication apparatus is provided. The apparatus is configured to perform the method in any possible implementation of the foregoing aspects. Specifically, the apparatus includes units configured to perform the method in any possible implementation of the foregoing aspects.

According to a fifth aspect, another communication apparatus is provided. The apparatus includes a processor. The processor is coupled to a memory, and may be configured to execute instructions in the memory, to implement the method in any possible implementation of the foregoing aspects. Optionally, the communication apparatus further includes the memory. Optionally, the communication apparatus further includes a communication interface, and the processor is coupled to the communication interface.

In an implementation, the communication apparatus is an access network device. When the communication apparatus is the access network device, the communication interface may be a transceiver or an input/output interface.

In another implementation, the communication apparatus is a chip disposed in an access network device. When the communication apparatus is a chip disposed in a terminal device, the communication interface may be an input/output interface.

In an implementation, the communication apparatus is a core network device. When the communication apparatus is the core network device, the communication interface may be a transceiver or an input/output interface.

In another implementation, the communication apparatus is a chip disposed in a core network device. When the communication apparatus is the chip disposed in the core network device, the communication interface may be an input/output interface.

In an implementation, the communication apparatus is a terminal device. When the communication apparatus is the terminal device, the communication interface may be a transceiver or an input/output interface.

In another implementation, the communication apparatus is a chip disposed in a terminal device. When the communication apparatus is the chip disposed in the terminal device, the communication interface may be an input/output interface.

According to a sixth aspect, a processor is provided. The processor includes an input circuit, an output circuit, and a processing circuit. The processing circuit is configured to: receive a signal through the input circuit, and transmit a signal through the output circuit, so that the processor performs the method in any possible implementation of the foregoing aspects.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in embodiments of this application.

According to a seventh aspect, a processing apparatus is provided. The apparatus includes a processor and a memory. The processor is configured to: read instructions stored in the memory, receive a signal through a receiver, and transmit a signal through a transmitter, to perform the method in any possible implementation of the foregoing aspects.

Optionally, there are one or more processors and one or more memories.

Optionally, the memory may be integrated into the processor, or the memory and the processor are separately disposed.

In a specific implementation process, the memory may be a non-transitory memory, such as a read-only memory (ROM). The memory and the processor may be integrated into one chip, or may be disposed in different chips. A type of the memory and a manner in which the memory and the processor are disposed are not limited in this embodiment of this application.

It should be understood that, a related data exchange process such as sending of indication information may be a process of outputting the indication information from the processor, and receiving of capability information may be a process of receiving the input capability information by the processor. Specifically, data output by the processor may be output to a transmitter, and input data received by the processor may be from a receiver. The transmitter and the receiver may be collectively referred to as a transceiver.

The processing apparatus in the seventh aspect may be a chip. The processor may be implemented by using hardware, or may be implemented by using software. When the processor is implemented by using the hardware, the processor may be a logic circuit, an integrated circuit, or the like; or when the processor is implemented by using the software, the processor may be a general-purpose processor, and is implemented by reading software code stored in the memory. The memory may be integrated into the processor, may be located outside the processor, and may exist independently.

According to an eighth aspect, a computer program product is provided. The computer program product includes a computer program (which may also be referred to as code or an instruction). When the computer program is run, a computer is enabled to perform the method in any possible implementation of the foregoing aspects.

According to a ninth aspect, a computer-readable medium is provided. The computer-readable medium stores a computer program (which may also be referred to as code or an instruction). When the computer program is run on a computer, the computer is enabled to perform the method in any possible implementation of the foregoing aspects.

According to a tenth aspect, a communication system is provided. The system includes the foregoing terminal device, access network device, and core network device.

DESCRIPTION OF EMBODIMENTS

Figure 1:
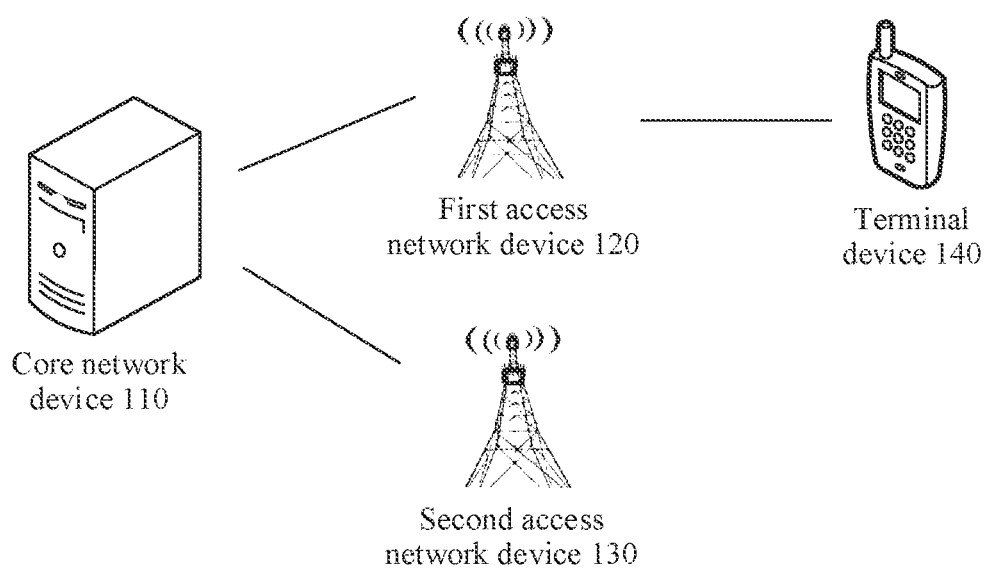
FIG. 1 is a schematic diagram of a communication system according to an embodiment of this application.

Technical solutions in embodiments of this application may be applied to various communication systems, for example, a long term evolution (LTE) system, an LTE frequency division duplex (FDD) system, an LTE time division duplex (TDD) system, a universal mobile telecommunications system (UMTS), a 5th generation (5G) system, new radio (NR), or another evolved communication system.

A terminal device in embodiments of this application may also be referred to as user equipment (UE), a mobile station (MS), a mobile terminal (MT), an access terminal, a subscriber unit, a subscriber station, a mobile station, a remote station, a remote terminal, a mobile device, a user terminal, a terminal, a wireless communication device, a user agent, a user apparatus, or the like.

The terminal device may be a device that provides voice/data connectivity for a user, for example, a handheld device or a vehicle-mounted device that has a wireless connection function. Currently, some examples of the terminal are a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self-driving (self-driving), a wireless terminal in remote surgery (remote medical surgery), a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a 5G network, or a terminal device in a future evolved public land mobile communication network (PLMN). This is not limited in embodiments of this application.

As an example instead of a limitation, in embodiments of this application, the terminal device may alternatively be a wearable device. The wearable device may also be referred to as a wearable intelligent device, and is a general term of wearable devices such as glasses, gloves, watches, clothes, and shoes that are developed by applying wearable technologies in intelligent designs of daily wear. The wearable device is a portable device that is directly worn on a body or integrated into clothes or an accessory of a user. The wearable device is more than a hardware device, and implements powerful functions through software support, data exchange, and cloud interaction. Generalized wearable intelligent devices include full-featured and large-size devices that can implement complete or partial functions without depending on smartphones, such as smart watches or smart glasses, and devices that focus on only one type of application and need to work with other devices such as smartphones, such as various smart bands or smart jewelry for monitoring physical signs.

In addition, the terminal device in embodiments of this application may alternatively be a terminal device in an internet of things (IoT) system. IoT is an important part of future development of information technologies. A main technical feature of the IoT is connecting a thing to a network by using a communication technology, to implement an intelligent network for interconnection between a person and a machine or between one thing and another.

In addition, an access network device and a core network device in embodiments of this application may be collectively referred to as a network device. The access network device may be a device configured to communicate with the terminal device, and may also be referred to as a radio access network device. The access network device may be a transmission reception point (TRP), integrated access and backhaul (JAB), an evolved NodeB (eNB or eNodeB) in an LTE system, a home base station (for example, a home evolved NodeB or a home NodeB, HNB), a baseband unit (BBU), or a radio controller in a cloud radio access network (CRAN) scenario. Alternatively, the access network device may be a relay station, an access point, a vehicle-mounted device, a wearable device, an access network device in the 5G network, an access network device in the future evolved public land mobile network (PLMN), an access point (AP) in a WLAN, or a gNB or a ng-eNB in a new radio (NR) system. This is not limited in embodiments of this application.

In a network structure, the access network device may include a centralized unit (CU) node, a distributed unit (DU) node, a RAN device including the CU node and the DU node, or a RAN device including a CU control plane node (CU-CP node), a CU user plane node (CU-UP node), and a DU node.

The access network device provides a cell with a service, and the terminal device communicates with the cell by using a transmission resource (for example, a frequency domain resource or a spectrum resource) allocated by the access network device. The cell may belong to a macro base station (for example, a macro eNB or a macro gNB), or may belong to a base station corresponding to a small cell. The small cell herein may include a metro cell, a micro cell, a pico cell, a femto cell, and the like. These small cells are characterized by small coverage and a low transmit power, and are applicable to providing a high-rate data transmission service.

A core network element in embodiments of this application may be a core network element in a 4G network, for example, a mobility management entity (MME) or a serving gateway (SGW), may be a core network element in the 5G network, for example, an access and mobility management function (AMF) network element, a user plane function (UPF) network element, or may be a core network element having another name. This is not limited in embodiments of this application.

In embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems, for example, a Linux operating system, a Unix operating system, an Android operating system, an iOS operating system, or a Windows operating system, that implement service processing by using a process. The application layer includes applications such as a browser, an address book, word processing software, and instant messaging software. In addition, a specific structure of an execution body of a method provided in embodiments of this application is not specifically limited in embodiments of this application, provided that a program that records code of the method provided in embodiments of this application can be run to perform communication according to the method provided in embodiments of this application. For example, the method provided in embodiments of this application may be performed by the terminal device or the network device, or a function module that can invoke and execute the program in the terminal device or the network device.

In addition, aspects or features of this application may be implemented as a method, an apparatus, or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but are not limited to a wireless channel, and various other media that can store, include, and/or carry instructions and/or data.

For ease of understanding embodiments of this application, a communication system applicable to embodiments of this application is first described in detail with reference to FIG. 1.

FIG. 1 is a schematic diagram of a communication system applicable to embodiments of this application. As shown in FIG. 1, the communication system may include a core network device 110, a first access network device 120, a second access network device 130, and a terminal device 140. The terminal device 140 is in a cell corresponding to a coverage area of the first access network device, and may be connected to the first access network device 120 in a wireless manner. The first access network device 120 and the second access network device 130 may be connected to the core network device 110 in a wireless or wired manner.

The core network device 110 and the first access network device 120 (or the second access network device 130) may be different physical devices that are independent of each other, or functions of the terminal device 140 and logical functions of an access network device may be integrated into a same physical device, or some functions of the core network device and some functions of the access network device may be integrated into one physical device. This is not limited in this embodiment of this application.

In addition, in this embodiment of this application, in a possible implementation, the terminal device 140 may be movable. If the terminal device 140 moves to the cell corresponding to the coverage area of the first access network device 120, the terminal device 140 may transmit an uplink data packet to the first access network device 120, and the first access network device 120 sends the uplink data packet to the core network device 110. Alternatively, the first access network device 120 may transmit a downlink data packet from the core network device 110 to the terminal device 140. If the terminal device 140 moves to a cell corresponding to a coverage area of the second access network device 130, a data transmission manner is the same. Details are not described again.

In this embodiment of this application, in another possible implementation, the first access network device 120 and the second access network device 130 may be movable. If movement of the first access network device 120 causes the terminal device 140 to be located in the cell corresponding to the coverage area of the first access network device 120, the terminal device 140 may transmit an uplink data packet to the first access network device 120, and the first access network device 120 sends the uplink data packet to the core network device 110. Alternatively, the first access network device 120 may transmit a downlink data packet from the core network device 110 to the terminal device 140. If movement of the second access network device 130 causes the terminal device 140 to be located in a cell corresponding to a coverage area of the second access network device 130, a data transmission manner is the same. Details are not described again.

The access network device (including the first access network device 120 and the second access network device 130) may include a baseband apparatus and a radio frequency apparatus. The baseband apparatus may be implemented by one node, or may be implemented by a plurality of nodes. The radio frequency apparatus may be independently implemented remotely from the baseband apparatus, or may be integrated into the baseband apparatus, or a part of the radio frequency apparatus is implemented remotely from the baseband apparatus and a remaining part is integrated into the baseband apparatus. For example, in an LTE communication system, the access network device includes a baseband apparatus and a radio frequency apparatus. The radio frequency apparatus may be remotely disposed relative to the baseband apparatus. For example, a remote radio unit (RRU) is remotely disposed relative to a BBU.

A plurality of antennas may be configured for each of the foregoing communication devices, for example, the core network device 110, the first access network device 120, the second access network device 130, or the terminal device 140 in FIG. 1. The plurality of antennas may include at least one transmit antenna configured to send a signal and at least one receive antenna configured to receive a signal. In addition, the communication device further additionally includes a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and receiving. Therefore, the access network device and the terminal device may communicate with each other by using a multi-antenna technology.

It should be understood that FIG. 1 is only a schematic diagram. The communication system may further include other network devices, for example, a wireless relay device and a wireless backhaul device, which are not shown in FIG. 1. Quantities of core network devices, access network devices, and terminal devices included in the communication system are not limited in this embodiment of this application.

For ease of understanding, the following first describes related terms in embodiments of this application.

1. Non-Terrestrial Network (NTN)

Because a conventional terrestrial network cannot provide seamless coverage for a terminal device, especially in a place in which a base station cannot be deployed, for example, a sea, a desert, or the air, a non-terrestrial network is introduced into a communication system. An NTN communication system may include a satellite communication system, a high altitude platform station (HAPS) communication system, or another non-terrestrial communication system. The NTN communication system provides seamless coverage for the terminal device by deploying an access network device or some functions of the access network device on a non-terrestrial device (for example, a high altitude platform station or a satellite). Because the non-terrestrial device is less affected by a natural disaster, reliability of the communication system can be improved.

For ease of description and understanding of solutions in embodiments of this application, an NTN communication system in which a network device is deployed on a satellite is used as an example for description in this application. In addition, for ease of description, "a network device on a satellite" is replaced with "a satellite" subsequently in this application. In other words, communication between the terminal device and the satellite subsequently described in this application actually refers to communication between the terminal device and the network device on the satellite. A unified description is provided herein, and details are not described subsequently.

In a non-terrestrial network deployed based on a satellite, the satellite adjusts antennas to form different beams to cover the earth. Based on different mapping manners, cells can be divided into two types: a quasi earth fixed cell and a quasi earth moving cell. A mapping manner of the quasi earth fixed cell is that locations of cells do not change on the earth, and a mobile satellite forms these cells by adjusting beams of the mobile satellite. A mapping manner of the quasi earth moving cell is: Beams generated by a satellite move on the earth as the satellite moves, and correspondingly, a cell formed by the beams also moves on the earth. An NTN network device corresponding to the cell may also be referred to as a low-earth orbit (LEO) satellite, or referred to as another mobile NTN network device.

2. RRC Status

An NR system is used as an example. A radio resource control status of a terminal device includes a connected state (RRC_CONNECTED), an inactive state (RRC_INACTIVE), and an idle state (RRC_IDLE). The following separately describes the three states.

(1) When a terminal device is in the connected state, the terminal device has established links with an access network device and a core network device. When data arrives at a network, the core network device and the access network device may directly transmit the data to the terminal device.

(2) When a terminal device is in the inactive state, it indicates that the terminal device has previously established links with an access network device and a core network device, but the link between the terminal device and the access network device is released. Although the link is released, the access network device needs to store a context of the terminal device. When data needs to be transmitted, the access network device may quickly resume the released link based on the context of the terminal device.

Usually, an access network device that configures a terminal device to enter the inactive state and that stores a context of the terminal device may be referred to as an anchor access network device or a source access network device. It should be understood that, however, as the terminal device moves, the anchor access network device may change. To be specific, if an original anchor access network device transfers the context of the terminal device to a new access network device, the new access network device is subsequently used as a new anchor access network device. Certainly, the anchor access network device may alternatively choose not to transfer the context of the terminal device. This is not limited herein.

(3) When a terminal device is in the idle state, there is no link between the terminal device and an access network device or between the terminal device and a core network device. When data needs to be transmitted, a link between the terminal device and the access network device and a link between the terminal device and the core network device need to be established.

It can be learned from the foregoing that, the inactive state can change by using an RRC connection release message only when a terminal device is in the connected state. When the terminal device is released from the connected state to the inactive state, an access network device (that is, the foregoing anchor access network device or source access network device) that serves the terminal device stores a context of the terminal device, and allocates an identifier to the terminal device, to identify the stored context of the terminal device. When subsequently initiating an RRC connection resume procedure, the terminal device needs to carry the identifier and send the identifier to an access network device (which may be referred to as a target access network device) that currently serves the terminal device, to obtain the context of the terminal device. Because the terminal device has mobility, the target access network device and the anchor access network device are usually different devices, and the target access network device needs to obtain the context of the terminal device from the anchor access network device based on the identifier.

It may be understood that, a name of the RRC status in NR is merely used as an example for description, and should not constitute any limitation on this application. This application does not exclude a case in which another possible name that has a same or similar feature is defined in an existing protocol or a future protocol to replace the name of the RRC status in NR.

It is considered that in some scenarios, for example, the foregoing non-terrestrial network (NTN) scenario, a movement speed of the access network device is fast. For example, the terminal device needs to change a serving cell (in other words, change the target access network device) every 1 minute to 2 minutes. However, the context of the terminal device is stored only in the anchor access network device. If the terminal device in the inactive state requests to resume an RRC connection, it is difficult for the target access network device to find the anchor access network device to obtain the context information of the terminal device from the anchor access network device. If the context information of the terminal device may be stored in another network device, a mechanism for verifying the terminal device by the network device needs to be considered. In view of this, this application provides a communication method, to ensure running of a connection resume mechanism of a terminal device, and reduce impact of mobility of an access network device on a connection resume procedure of the terminal device, thereby improving system performance.

The following describes in detail embodiments provided in this application with reference to the accompanying drawings. In embodiments shown below, "first", "second", "third", and various numbers are merely used for distinguishing for ease of description, and are not used to limit the scope of embodiments of this application. For example, the numbers are used to distinguish different information and different security verification parameters.

Figure 2:
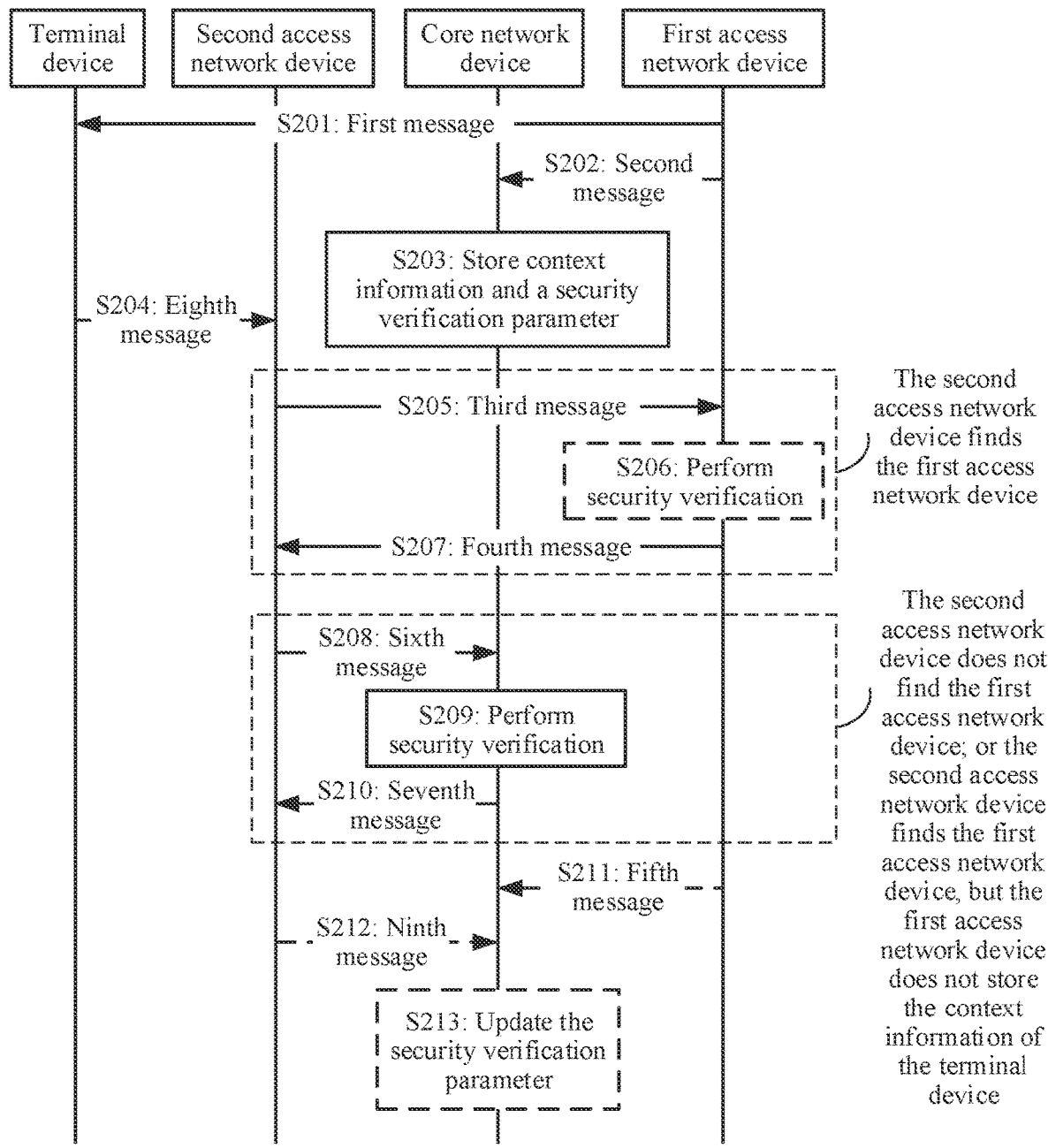
FIG. 2 is a schematic flowchart of a communication method according to an embodiment of this application.

FIG. 2 is a schematic flowchart of a communication method 200 according to an embodiment of this application. The method 200 may be applied to the communication system shown in FIG. 1, but this embodiment of this application is not limited thereto. In the method 200, a first access network device is equivalent to the foregoing anchor access network device or source access network device, and a second access network device is equivalent to the foregoing target access network device. The method includes the following steps.

S201: The first access network device sends a first message to a terminal device, where the first message is used to indicate the terminal device to enter an inactive state. Correspondingly, the terminal device receives the first message, and enters the inactive state.

It should be understood that, when determining that the terminal device needs to enter the inactive state, the first access network device sends the first message to the terminal device, and stores context information of the terminal device. The context information of the terminal device may also be referred to as a context of the terminal device or context data of the terminal device. The context information of the terminal device may include information such as a PDU session context, a security key, a wireless capability of the terminal device, and a security capability of the terminal device. The first message may also be referred to as an RRC connection release (RRC release) message, or another name. This is not limited in this embodiment of this application.

Optionally, the first message may carry an identifier (for example, an inactive radio network temporary identifier (I-RNTI)) allocated by the first access network device to the terminal device, and the identifier is used to identify the context information of the terminal device stored by the first access network device. Optionally, the first message may further carry a next hop chaining count (NCC), used for key derivation.

S202: The first access network device sends a second message to a core network device, where the second message carries the context information and a first security verification parameter of the terminal device, and the first security verification parameter is used to perform security verification on the terminal device. Correspondingly, the core network device receives the second message.

The first security verification parameter may include a first cell radio network temporary identifier (C-RNTI) allocated by the first access network device to the terminal device. Optionally, the first security verification parameter may further include a first physical cell identifier (PCI) of a cell of the first access network device in which the terminal device is located.

S203: The core network device stores the context information and the first security verification parameter.

To avoid a case in which another access network device cannot find the first access network device, the first access network device may send the context information and the first security verification parameter of the terminal device to the core network device, and the core network device may store the context information and the first security verification parameter, so that the another access network device obtains the context information of the terminal device from the core network device. Because the context information of the terminal device is stored in the core network device, the core network device needs to also store the first security verification parameter. In this way, when the another access network device obtains the context information of the terminal device from the core network device, the core network device performs security verification on the terminal device.

S204: The terminal device sends an eighth message to the second access network device, where the eighth message is used to request to resume a connection (to be specific, a connection between the terminal device and the second access network device, for example, an RRC connection). Correspondingly, the second access network device receives the eighth message from the terminal device.

Due to mobility of the terminal device and/or an access network device, when a terminal device in the inactive state needs to resume a connection (that is, change to an active state), the terminal device is already in a cell corresponding to a coverage area of the second access network device, and the second access network device needs to serve the terminal device. Therefore, the terminal device may send the eighth message to the second access network device, to request to resume the connection.

For example, the eighth message may carry the identifier (for example, the I-RNTI) allocated by the first access network device to the terminal device, so that the second access network device obtains the context information of the terminal device based on the identifier. In addition, the eighth message may further carry authentication information of the terminal device. In an example, the authentication information may be a short message authentication code-integrity (short MAC-I) message, and the short MAC-I message is a 16-bit authentication message. For example, the terminal device may use the C-RNTI of the cell of the first access network device in which the terminal device is located, the PCI of the cell, and an ID of a cell of the second access network device in which the terminal device is currently located as inputs, and obtain the short MAC-I message through calculation with reference to another key parameter.

Optionally, the eighth message may further carry a reason why the terminal device requests to resume the connection. The reason for requesting to resume the connection may be, for example, any one of a reason triggered by a radio access network notification area update (RAN notification area update, RNAU) or a reason triggered by another active or passive service. This is not limited in this embodiment of this application.

In this embodiment of this application, the second access network device may obtain the context information of the terminal device in the following plurality of different cases.

Case 1: The second access network device does not find the first access network device, or the second access network device does not search for the first access network device. In this case, the second access network device can request the context information of the terminal device only from the core network device. Therefore, in this embodiment, the following procedure may be performed after S201 to S204.

S208: The second access network device sends a sixth message to the core network device, where the sixth message is used to request the context information of the terminal device. Correspondingly, the core network device receives the sixth message.

For example, the sixth message may carry the I-RNTI and the authentication information. In addition, the sixth message further carries the cell ID of the cell of the second access network device in which the terminal device is currently located.

Optionally, the sixth message may further carry a second security verification parameter. The second security verification parameter includes a second C-RNTI allocated by the second access network device to the terminal device. Optionally, the second security verification parameter further includes a second PCI of the cell of the second access network device in which the terminal device is located. It should be understood that, in this specification, the cell of the second access network device refers to a cell of the second access network device in which the terminal device initiates an access request or a resume request.

S209: The core network device performs security verification on the terminal device based on the first security verification parameter.

After receiving the sixth message from the second access network device, the core network device may verify the terminal device by using the previously stored first security verification parameter. For example, the core network device may verify the terminal device based on the first C-RNTI or based on the first C-RNTI and the first PCI.

For example, the authentication information carried in the eighth message is the short MAC-I message, the foregoing verifying the terminal device may refer to verifying the short MAC-I message of the terminal device. The core network device obtains, through calculation according to a same method, a short MAC-I message by using a previously stored key and the previously stored first security verification parameter. The core network device compares the short MAC-I message obtained by the core network device through calculation with the short MAC-I message received from the second access network device. If the messages are the same, the verification succeeds; otherwise, the verification fails.

S210: When the security verification succeeds, the core network device sends a seventh message to the second access network device. The seventh message carries the context information, or the seventh message indicates the core network device not to provide the second access network device with the context information. Correspondingly, the second access network device receives the seventh message from the core network device.

Further, the second access network device may send a response message (not shown in FIG. 2) to the terminal device based on the seventh message. When the seventh message carries the context information, the response message may indicate to allow the terminal device to resume the connection, or the response message may indicate the terminal device to release the connection. When the seventh message indicates the core network device not to provide the second access network device with the context information, the response message may indicate to reject the terminal device to resume the connection, or the response message may indicate the terminal device to release the connection. In an implementation, the core network device generates a response message, and sends a seventh message carrying the response message to the second access network device, where the seventh message indicates the core network device not to provide the second access network device with the context information, and the second access network device forwards the response message to the terminal device.

When the security verification succeeds, the core network device may determine whether to provide the second access network device with the context of the terminal device. If the core network device determines to provide the second access network device with the context information of the terminal device, the core network device may find the context information of the terminal device based on the identifier (for example, the I-RNTI) allocated by the first access network device to the terminal device, and directly send the context information to the second access network device. If the core network device determines not to provide the second access network device with the context information of the terminal device, the core network device may send the second access network device a message used to indicate the core network device not to provide the second access network device with the context information.

Optionally, the sixth message may carry the reason why the terminal device requests to resume the connection, and the reason for requesting to resume the connection is obtained by the second access network device from the eighth message that is from the terminal device. The reason for requesting to resume the connection may be, for example, any one of a reason triggered by a radio access network notification area update (RAN notification area update, RNAU) or a reason triggered by another active or passive service. This is not limited in this embodiment of this application. The core network device may determine, based on the reason why the terminal device requests to resume the connection, whether to provide the second access network device with the context information of the terminal device.

According to the communication method in this embodiment of this application, the first access network device sends the core network device the context information of the terminal device and a security verification parameter used to verify the terminal device. In this way, the second access network device may obtain the context information of the terminal device from the core network device, so as to resume the connection between the terminal device and the second access network device, avoid a case in which the connection cannot be resumed when the second access network device cannot find the first access network device or the first access network device does not provide the context information of the terminal device, ensure running of a connection resume mechanism of the terminal device, and reduce impact of mobility of an access network device on a connection resume procedure of the terminal device, thereby improving system performance.

Case 2: The second access network device finds the first access network device, but the first access network device does not store the context information of the terminal device, in other words, the first access network device cannot provide the second access network device with the context information of the terminal device. In this case, in this embodiment, the following procedure may be performed after S201 to S204.

S205: The second access network device sends a third message to the first access network device, where the third message is used to request the context information of the terminal device. Correspondingly, the first access network device receives the third message.

For example, the third message may carry the I-RNTI and the authentication information. In addition, the third message further carries the cell ID of the cell of the second access network device in which the terminal device is currently located.

Optionally, the third message further carries a second security verification parameter of a cell of the second access network device in which the terminal device is currently located. The second security verification parameter includes a second C-RNTI allocated by the second access network device to the terminal device. Optionally, the second security verification parameter further includes a second PCI of the cell of the second access network device in which the terminal device is located.

S207: The first access network device may directly send a fourth message to the second access network device, where the fourth message indicates the first access network device not to provide the second access network device with the context information. For example, because the first access network device does not store the context information of the terminal device, the first access network device cannot perform security verification on the terminal device, and the first access network device cannot provide the second access network device with the context information. Correspondingly, the second access network device receives the fourth message.

Optionally, the fourth message further indicates identification information of the core network device.

S208: The second access network device may obtain the identification information of the core network device from the fourth message, and send a sixth message to the core network device. Correspondingly, the core network device receives the sixth message.

S209: The core network device performs security verification on the terminal device based on the first security verification parameter.

S210: When the security verification succeeds, the core network device sends a seventh message to the second access network device, where the seventh message carries the context information, or the seventh message indicates the core network device not to provide the second access network device with the context information. Correspondingly, the second access network device receives the seventh message from the core network device.

Further, the second access network device may send a response message (not shown in FIG. 2) to the terminal device based on the seventh message.

For specific descriptions of S208 to S210 and sending of the response message to the terminal device, refer to Case 1. Details are not described herein again.

Case 3: The second access network device finds the first access network device, and the first access network device stores the context information of the terminal device. However, the first access network device determines not to provide the second access network device with the context information of the terminal device. In this case, in this embodiment, the following procedure may be performed after S201 to S204.

S205: The second access network device sends a third message to the first access network device, where the third message is used to request the context information of the terminal device. Correspondingly, the first access network device receives the third message. For a specific description of S205, refer to Case 2. Details are not described herein again.

S206: Because the first access network device stores the context of the terminal device, the first access network device may perform security verification on the terminal device by using the first security verification parameter. For a specific description of performing security verification by the first access network device, refer to the description of performing security verification by the core network device in Case 1. Details are not described herein again.

S207: When the security verification succeeds, the first access network device may determine whether to provide the second access network device with the context of the terminal device. For example, the third message may carry the reason why the terminal device requests to resume the connection. The first access network device may determine, based on the reason why the terminal device requests to resume the connection, whether to provide the second access network device with the context information of the terminal device.

In Case 3, the first access network device determines not to provide the second access network device with the context information of the terminal device, and the first access network device may send a fourth message to the second access network device, where the fourth message indicates the first access network device not to provide the second access network device with the context information of the terminal device. Correspondingly, the second access network device receives the fourth message.

Further, the second access network device may send a response message (not shown in FIG. 2) to the terminal device based on the fourth message. The response message may indicate to reject the terminal device to resume the connection, or the response message may indicate the terminal device to release the connection. In an implementation, the first access network device generates a response message, and sends a fourth message carrying the response message to the second access network device, where the fourth message indicates the first access network device not to provide the second access network device with the context information of the terminal device, and the second access network device forwards the response message to the terminal device.

S211: The first access network device sends a fifth message to the core network device, where the fifth message carries the second security verification parameter, to update a security verification parameter stored in the core network device. Correspondingly, the core network device receives the fifth message.

For example, when the first access network device sends a fourth message to the second access network device, where the fourth message carries a response message, and the response message indicates the terminal device to release the connection and enter the inactive state, the first access network device sends the fifth message to the core network device.

S213: The core network device updates the security verification parameter from the first security verification parameter to the second security verification parameter.

When the first access network device successfully performs security verification on the terminal device, but determines not to provide the context information of the terminal device, the first access network device needs to update the stored security verification parameter, and update the security verification parameter for the core network device. That is, the core network device needs to update the security verification parameter from the first security verification parameter to the second security verification parameter, so as to perform security verification on the terminal device next time. Therefore, the second security verification parameter needs to be carried in the third message. The second access network device sends the third message to the first access network device, and then the first access network device sends the third message to the core network device by using the fifth message. In this way, the core network device may obtain a latest security verification parameter, so as to perform security verification on the terminal device next time, thereby ensuring that security verification parameters stored in the terminal device and the core network device are consistent and avoiding a security verification failure. Therefore, running of a connection resume mechanism of the terminal device can be ensured, impact of mobility of an access network device on a connection resume procedure of the terminal device is reduced, and system performance is improved.

Case 4: The second access network device finds the first access network device, the first access network device stores context information of the terminal device, and the first access network device determines to provide the second access network device with the context information of the terminal device. In this case, in this embodiment, the following procedure may be performed after S201 to S204.

S205: The second access network device sends a third message to the first access network device, where the third message is used to request the context information of the terminal device. Correspondingly, the first access network device receives the third message. For a specific description of S205, refer to Case 2. Details are not described herein again.

S206: Because the first access network device stores the context of the terminal device, the first access network device may perform security verification on the terminal device by using the first security verification parameter. For a specific description of performing security verification by the first access network device, refer to the description of performing security verification by the core network device in Case 1. Details are not described herein again.

S207: When the security verification succeeds, the first access network device may determine whether to provide the second access network device with the context of the terminal device. For example, the third message may carry a reason why the terminal device requests to resume the connection. The first access network device may determine, based on the reason why the terminal device requests to resume the connection, whether to provide the second access network device with the context information of the terminal device.

In Case 4, the first access network device determines to provide the second access network device with the context information of the terminal device, and the first access network device may send a fourth message to the second access network device, where the fourth message carries the context information of the terminal device. Correspondingly, the second access network device receives the fourth message.

Further, the second access network device may send a response message (not shown in FIG. 2) to the terminal device based on the fourth message. The response message may indicate to allow the terminal device to resume the connection, or the response message may indicate the terminal device to release the connection.

S212: The second access network device sends a ninth message to the core network device, where the ninth message carries a second security verification parameter, to update a security verification parameter stored in the core network device. Correspondingly, the core network device receives the ninth message. For example, when the second access network device sends a response message to the terminal device, and the response message indicates the terminal device to release the connection and enter the inactive state, the second access network device sends the ninth message to the core network device.

Optionally, the ninth message further carries the context information of the terminal device, so that when the terminal device resumes the connection next time, if a new access network device that serves the terminal device cannot find the second access network device, the new access network device may obtain the context information of the terminal device from the core network device.

S213: The core network device updates the security verification parameter from the first security verification parameter to the second security verification parameter. For a specific description of S213, refer to Case 3. Details are not described herein again.

In the method 200, in an optional embodiment, after the first access network device sends a second message to a core network device, the method further includes: The first access network device deletes the context information of the terminal device.

In the method 200, in an optional embodiment, when the core network device sends the context information to the second access network device, the method further includes: The core network device deletes the context information of the terminal device.

Figure 3:
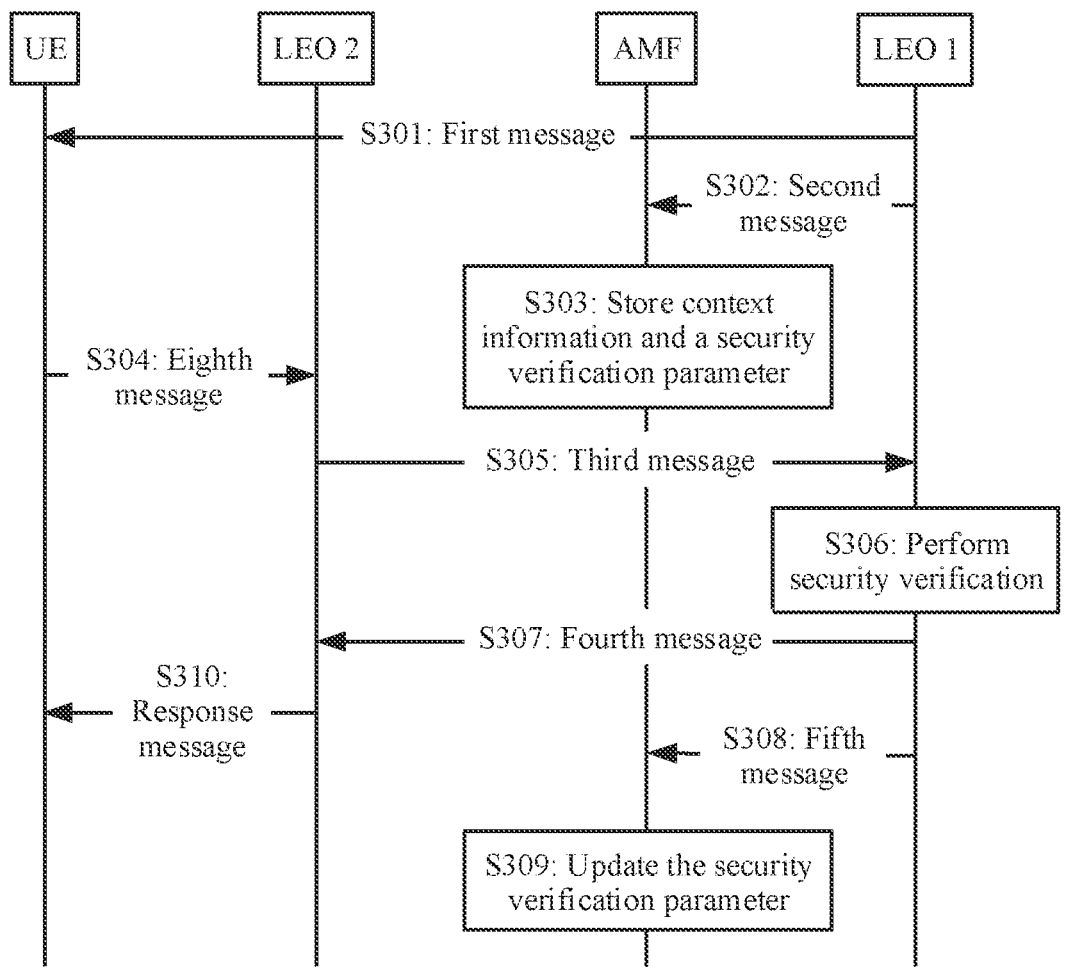
FIG. 3 is a schematic flowchart of another communication method according to an embodiment of this application.
Figure 4:
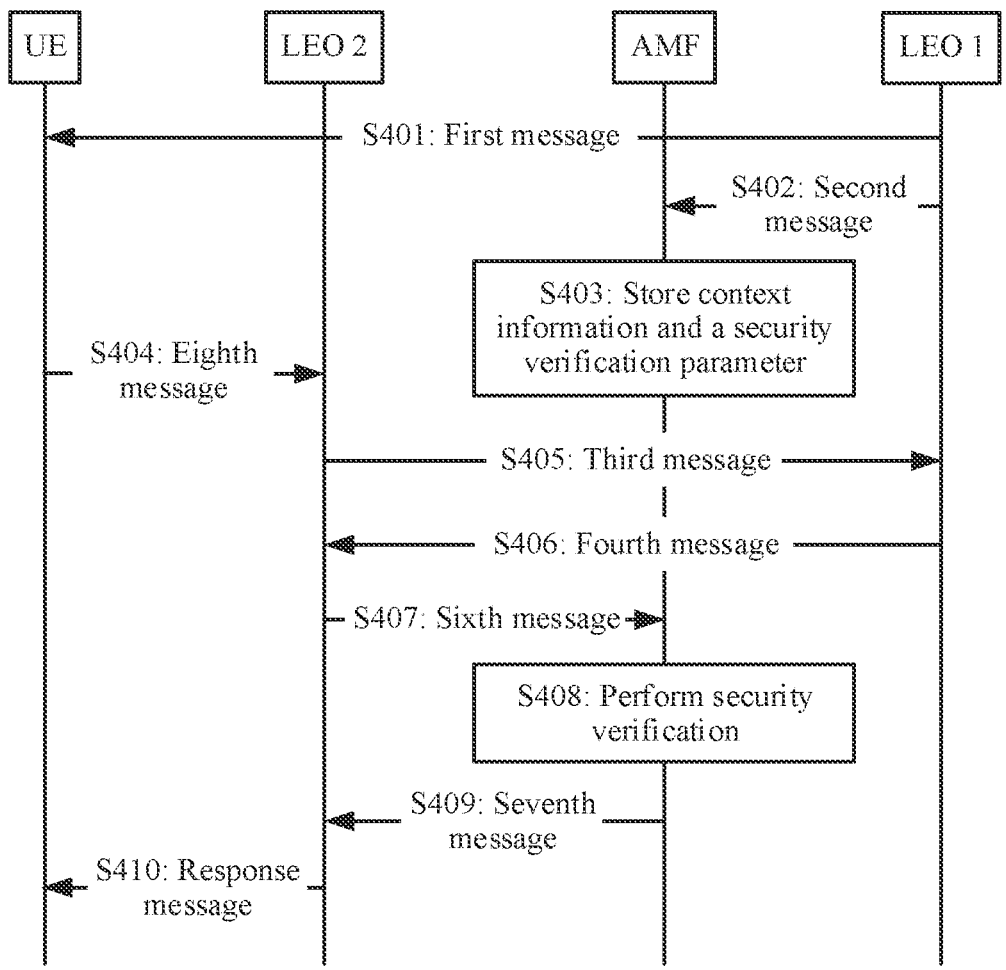
FIG. 4 is a schematic flowchart of another communication method according to an embodiment of this application.

The following describes in detail embodiments of this application with reference to FIG. 3 and FIG. 4 by using an example in which the terminal device is UE, the first access network device is an LEO 1, the second access network device is an LEO 2, and the core network device is an AMF.

FIG. 3 is a schematic flowchart of another communication method 300 according to an embodiment of this application. The method 300 may be applied to the system architecture shown in FIG. 1, but this embodiment of this application is not limited thereto. The method 300 is applied to a scenario in which context information of UE is stored in an LEO 1 when the UE requests to resume a connection, and the method includes the following steps.

S301: The LEO 1 sends a first message to the UE, where the first message is used to request the UE to enter an inactive state, and the LEO 1 stores the context information of the UE. Correspondingly, the UE receives the first message, and enters the inactive state.

S302: The LEO 1 sends a second message to an AMF, where the second message carries the context information and a first security verification parameter of the UE. Correspondingly, the AMF receives the second message.

The first security verification parameter may include a first C-RNTI allocated by the LEO 1 to the UE. The first security verification parameter may further include a first PCI of a cell of the LEO 1 in which the UE is located. The AMF may perform security verification on the UE based on the first security verification parameter when another access network device requests to obtain the context information of the UE next time.

S303: The AMF stores the context information and the first security verification parameter of the UE.

S304: The UE sends an eighth message to an LEO 2, where the eighth message is used to request to resume the connection. Correspondingly, the LEO 2 receives the eighth message.

S305: The LEO 2 may find the LEO 1, and send a third message to the LEO 1, where the third message is used to request the context of the terminal device. Correspondingly, the LEO 1 receives the third message.

The third message may include a second security verification parameter, and the second security verification parameter includes a second C-RNTI allocated by the LEO 2 to the UE. Optionally, the second security verification parameter may further include a second PCI of a cell of the LEO 2 in which the UE initiates an access request or a resume request.

S306: The LEO 1 performs security verification on the terminal device.

S307: The LEO 1 sends a fourth message to the LEO 2.

If the security verification succeeds, the LEO 1 determines whether to provide the LEO 2 with the context information of the UE. In this embodiment of this application, the LEO 1 determines not to provide the LEO 2 with the context information of the UE, and the LEO 1 sends the fourth message (which may also be referred to as a rejection response) to the LEO 2, to indicate not to provide the context information of the UE. The LEO 1 generates a response message, where the fourth message carries the response message. The response message is used to indicate the UE to release an RRC connection.

S308: The LEO 1 sends a fifth message to the AMF, where the fifth message carries the second security verification parameter. Correspondingly, the AMF receives the fifth message. The second security verification parameter may include the second C-RNTI allocated by the LEO 2 to the UE and the second PCI of the cell of the LEO 2 in which the UE is located.

S309: The AMF updates a security verification parameter from the first security verification parameter to the second security verification parameter.

S310: After receiving the fourth message sent by the LEO 1, the LEO 2 sends a response message to the UE. The response message is used to release the RRC connection of the UE. Correspondingly, the UE receives the response message. The response message may be used to indicate the UE to enter an idle state or the inactive state. In an example, in this procedure, the response message indicates the UE to enter the inactive state.

According to the communication method in this embodiment of this application, the LEO 1 sends the AMF the context information of the UE and a security verification parameter used to verify the UE, but the LEO 1 still retains the context of the UE. If the UE initiates a resume request in the LEO 2, the LEO 2 requests to obtain the context of the UE from the LEO 1. Optionally, the LEO 2 may send a new security verification parameter to the LEO 1. If the LEO 1 successfully verifies the UE, but the LEO 1 does not provide the LEO 2 with the context of the UE, the LEO 1 needs to update the stored security verification parameter, and send an updated security verification parameter to the AMF. The updated security verification parameter is used for the next security verification of the terminal device to improve system security.

FIG. 4 is a schematic flowchart of another communication method 400 according to an embodiment of this application. The method 400 may be applied to the system architecture shown in FIG. 1, but this embodiment of this application is not limited thereto. The method 400 is applied to a scenario in which context information of UE is not stored in an LEO 1 when the UE requests to resume a connection, and the method includes the following steps.

S401: The LEO 1 sends a first message to the UE, where the first message is used to request the UE to enter an inactive state, and the LEO 1 stores the context information of the UE. Correspondingly, the UE receives the first message, and enters the inactive state.

S402: The LEO 1 sends a second message to an AMF, where the second message carries the context information and a first security verification parameter of the UE. Correspondingly, the AMF receives the second message.

The first security verification parameter may include a first C-RNTI allocated by the LEO 1 to the UE. The first security verification parameter may further include a first PCI of a cell of the LEO 1 in which the UE is located. The AMF may perform security verification on the UE based on the first security verification parameter when another access network device requests to obtain the context information of the UE next time.

S403: The AMF stores the context information and the first security verification parameter of the UE.

S404: The UE sends an eighth message to an LEO 2, where the eighth message is used to request to resume the connection. Correspondingly, the LEO 2 receives the eighth message.

Optionally, S405 includes: The LEO 2 may find the LEO 1, and send a third message to the LEO 1, where the third message is used to request the context of the terminal device. Correspondingly, the LEO 1 receives the third message.

The third message may include a second security verification parameter, and the second security verification parameter includes a second C-RNTI allocated by the LEO 2 to the UE. The second security verification parameter may further include a second PCI of a cell of the LEO 2 in which the UE initiates an access request or a resume request.

Optionally, S406 includes: The LEO 1 sends a fourth message to the LEO 2. The fourth message may carry an identifier of the AMF. The fourth message may indicate not to provide the LEO 2 with the context information of the UE. Correspondingly, the LEO 2 receives the fourth message. In this embodiment of this application, the LEO 1 does not store the context information of the UE. For example, the LEO 1 may delete the context information of the UE after S403.

S407: The LEO 2 sends a sixth message to the AMF, where the sixth message is used to request the context information of the UE. Correspondingly, the AMF receives the sixth message. Optionally, the LEO 2 may determine, based on the identifier of the AMF in the fourth message, an AMF that sends the sixth message.

Optionally, the sixth message may carry a second security verification parameter, used by the AMF to perform security verification on the UE next time. The second security verification parameter includes the second cell radio network temporary identifier C-RNTI allocated by the second access network device to the terminal device. The second security verification parameter may further include the second physical cell identifier PCI of a cell of the second access network device in which the terminal device initiates an access request or a resume request.

S408: The AMF performs security verification on the UE based on the stored first security verification parameter.

S409: When the security verification succeeds, the AMF sends a seventh message to the LEO 2, where the seventh message carries the context information of the UE, or the seventh message indicates the AMF not to provide the LEO 2 with the context information of the UE. Correspondingly, the LEO 2 receives the seventh message from the AMF. If the AMF does not provide the LEO 2 with the context information of the UE, the AMF may generate a response message, and send the seventh message including the response message to the LEO 2.

It should be understood that, if the security verification succeeds but the AMF determines not to provide the LEO 2 with the context information of the UE, the AMF needs to store the second security verification parameter carried in the sixth message, and update a security verification parameter from the first security verification parameter to the second security verification parameter, to improve system security.

S410: The LEO 2 sends a response message to the UE.

If the seventh message carries the context information, the response message may be used to resume the connection of the UE, or may be used to release the connection of the UE. Specifically, this may be determined by the LEO 2. If the seventh message indicates the AMF not to provide the context information of the UE, the response message is used to release the RRC connection of the UE. Correspondingly, the UE receives the response message. The response message may be used to indicate the UE to enter an idle state or the inactive state. In an example, in this procedure, the response message indicates the UE to enter the inactive state.

It may be understood that the LEO 2 may not perform S405 and S406. For example, the LEO 2 considers, by default, that the LEO 1 has deleted the context of the UE, and therefore requests only the context of the UE from the AMF. Specifically, the LEO 2 may request the context of the UE from the AMF connected to the LEO 2.

According to the communication method in this embodiment of this application, the LEO 1 sends the AMF the context information of the UE and a security verification parameter used to verify the UE, and then the LEO 1 deletes the context of the UE. In this way, the LEO 2 may obtain the context information of the UE from the AMF, so as to resume a connection between the UE and the LEO 2, avoid a case in which the connection cannot be resumed when the second access network device cannot find the first access network device or the first access network device does not provide the context information of the terminal device, ensure running of a connection resume mechanism of the terminal device, and reduce impact of mobility of an access network device on a connection resume procedure of the terminal device, thereby improving system performance.

It should be understood that, sequence numbers of the foregoing processes do not mean execution sequences. The execution sequences of the processes should be determined based on functions and internal logic of the processes, and should not be construed as any limitation on the implementation processes of embodiments of this application.

With reference to FIG. 1 to FIG. 4, the foregoing describes in detail the communication method according to embodiments of this application. With reference to FIG. 5 to FIG. 8, the following describes in detail a communication apparatus and a network device according to embodiments of this application.

Figure 5:
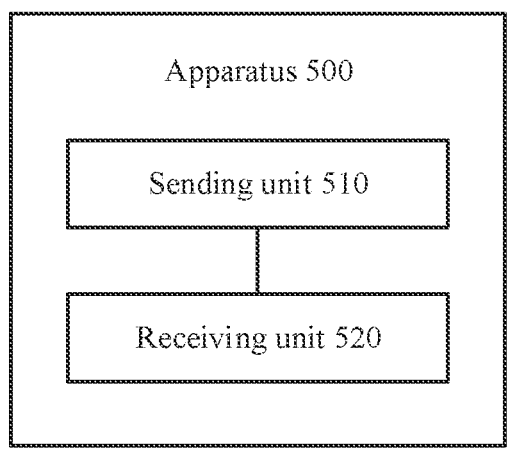
FIG. 5 is a schematic block diagram of a communication apparatus according to an embodiment of this application.

FIG. 5 is a schematic block diagram of a communication apparatus according to an embodiment of this application. The data transmission apparatus 500 may implement steps or procedures corresponding to the first access network device in the foregoing method embodiments. For example, the apparatus 500 may be the first access network device, or may be a chip or a circuit disposed in the first access network device. As shown in the figure, the apparatus 500 may include a sending unit 510 and a receiving unit 520.

The sending unit 510 is configured to: send a first message to a terminal device, where the first message is used to indicate the terminal device to enter an inactive state; and send a second message to a core network device, where the second message carries context information and a first security verification parameter of the terminal device, and the first security verification parameter is used to perform security verification on the terminal device. The receiving unit 520 is configured to receive a third message from a second access network device, where the third message is used to request the context information of the terminal device. The sending unit 510 is further configured to send a fourth message to the second access network device, where the fourth message indicates the first access network device not to provide the second access network device with the context information.

Optionally, the fourth message is further used to indicate identification information of the core network device.

Optionally, the first access network device stores the context information of the terminal device, and the apparatus further includes a processing unit, configured to perform security verification on the terminal device based on the first security verification parameter. The sending unit 510 is specifically configured to: when the security verification succeeds, if the communication apparatus determines not to provide the second access network device with the context information, send the fourth message to the second access network device.

Optionally, the third message carries a second security verification parameter of the terminal device, and the second security verification parameter is used to perform security verification on the terminal device. The sending unit 510 is specifically configured to send a fifth message to the core network device, where the fifth message carries the second security verification parameter, to update a security verification parameter stored in the core network device.

Optionally, the second security verification parameter includes a second cell radio network temporary identifier C-RNTI allocated by the second access network device to the terminal device and a second physical cell identifier PCI of a cell of the second access network device in which the terminal device is located.

Optionally, after sending the second message to the core network device, the apparatus further includes a processing unit, configured to delete the context information of the terminal device.

Optionally, the first security verification parameter includes a first C-RNTI allocated by the first access network device to the terminal device and a first PCI of a cell of the first access network device in which the terminal device is located.

It should be understood that the apparatus 500 herein is embodied in a form of a functional unit. The term "unit" herein may refer to an application-specific integrated circuit (ASIC), an electronic circuit, a processor (for example, a shared processor, a special purpose processor, or a group processor) configured to execute one or more software or firmware programs, a memory, a merge logic circuit, and/or another suitable component that supports the described function. In an optional example, a person skilled in the art may understand that the apparatus 500 may be specifically the first access network device in the foregoing embodiments. The apparatus 500 may be configured to perform procedures and/or steps corresponding to the first access network device in the foregoing method embodiments. To avoid repetition, details are not described herein again.

Figure 6:
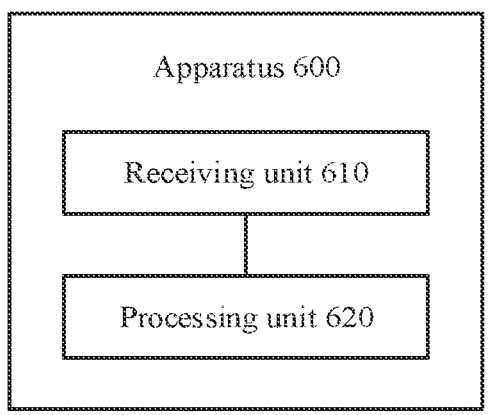
FIG. 6 is a schematic block diagram of another communication apparatus according to an embodiment of this application.

FIG. 6 is a schematic block diagram of another communication apparatus according to an embodiment of this application. The data transmission apparatus 600 may implement steps or procedures corresponding to the core network device in the foregoing method embodiments. For example, the apparatus 600 may be the core network device, or may be a chip or a circuit disposed in the core network device. As shown in the figure, the apparatus 600 may include a receiving unit 610 and a processing unit 620.

The receiving unit 610 is configured to receive a second message from a first access network device, where the second message carries context information and a first security verification parameter of a terminal device, and the first security verification parameter is used to perform security verification on the terminal device. The processing unit 620 is configured to store the context information and the first security verification parameter.

Optionally, the receiving unit 610 is further configured to receive a sixth message from a second access network device, where the sixth message is used to request the context information of the terminal device. The processing unit 620 is further configured to perform security verification on the terminal device based on the first security verification parameter. The apparatus further includes a sending unit, configured to: when the security verification succeeds, send a seventh message to the second access network device, where the seventh message carries the context information, or the seventh message indicates the core network device not to provide the second access network device with the context information.

Optionally, the sixth message carries a second security verification parameter of the terminal device, and the second security verification parameter is used to perform security verification on the terminal device. The processing unit 620 is further configured to update a security verification parameter from the first security verification parameter to the second security verification parameter.

Optionally, the second security verification parameter includes a second cell radio network temporary identifier C-RNTI allocated by the second access network device to the terminal device and a second physical cell identifier PCI of a cell of the second access network device in which the terminal device is located.

Optionally, when the core network device sends the context information to the second access network device, the processing unit 620 is further configured to delete the context information of the terminal device.

Optionally, the first security verification parameter includes a first C-RNTI allocated by the first access network device to the terminal device and a first PCI of a cell of the first access network device in which the terminal device is located.

It should be understood that the apparatus 600 herein is embodied in a form of a functional unit. The term "unit" herein may refer to an application-specific integrated circuit (ASIC), an electronic circuit, a processor (for example, a shared processor, a special purpose processor, or a group processor) configured to execute one or more software or firmware programs, a memory, a merge logic circuit, and/or another suitable component that supports the described function. In an optional example, a person skilled in the art may understand that the apparatus 600 may be specifically the core network device in the foregoing embodiments. The apparatus 500 may be configured to perform procedures and/or steps corresponding to the core network device in the foregoing method embodiments. To avoid repetition, details are not described herein again.

Figure 7:
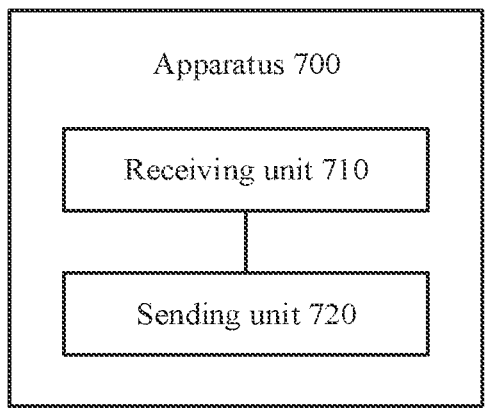
FIG. 7 is a schematic block diagram of another communication apparatus according to an embodiment of this application.

FIG. 7 is a schematic block diagram of another communication apparatus according to an embodiment of this application. The data transmission apparatus 700 may implement steps or procedures corresponding to the second access network device in the foregoing method embodiments. For example, the apparatus 700 may be the second access network device, or may be a chip or a circuit disposed in the second access network device. As shown in the figure, the apparatus 700 may include a receiving unit 710 and a sending unit 720.

The receiving unit 710 is configured to receive an eighth message from a terminal device, where the eighth message is used to request to resume a connection. The sending unit 720 is configured to send a sixth message to a core network device, where the sixth message is used to request context information of the terminal device. The receiving unit 710 is further configured to receive a seventh message from the core network device, where the seventh message carries the context information, or the seventh message indicates the core network device not to provide the second access network device with the context information.

Optionally, before sending the sixth message to the core network device, the sending unit 720 is further configured to send a third message to a first access network device based on the eighth message, where the third message is used to request the context information of the terminal device. The receiving unit 710 is further configured to receive a fourth message from the first access network device, where the fourth message indicates the first access network device not to provide the second access network device with the context information, and the fourth message further indicates identification information of the core network device. The sending unit 720 is further configured to send the sixth message to the core network device based on the identification information of the core network device.

Optionally, the fifth message carries a second security verification parameter of the terminal device, to enable the core network device to update a security verification parameter from a first security verification parameter to the second security verification parameter, and the second security verification parameter is used to perform security verification on the terminal device.

Optionally, the first security verification parameter includes a first cell radio network temporary identifier C-RNTI allocated by the first access network device to the terminal device and a first physical cell identifier PCI of a cell of the first access network device in which the terminal device is located. The second security verification parameter includes a second C-RNTI allocated by the second access network device to the terminal device and a second PCI of a cell of the second access network device in which the terminal device is located.

It should be understood that the apparatus 700 herein is embodied in a form of a functional unit. The term "unit" herein may refer to an application-specific integrated circuit (ASIC), an electronic circuit, a processor (for example, a shared processor, a special purpose processor, or a group processor) configured to execute one or more software or firmware programs, a memory, a merge logic circuit, and/or another suitable component that supports the described function. In an optional example, a person skilled in the art may understand that the apparatus 700 may be specifically the second access network device in the foregoing embodiments. The apparatus 500 may be configured to perform procedures and/or steps corresponding to the second access network device in the foregoing method embodiments. To avoid repetition, details are not described herein again.

The apparatus 500 has a function of implementing corresponding steps performed by the first access network device in the foregoing method. The apparatus 600 has a function of implementing corresponding steps performed by the core network device in the foregoing method. The apparatus 700 has a function of implementing corresponding steps performed by the second access network device in the foregoing method. The function may be implemented by hardware, or may be implemented by hardware by executing corresponding software. The hardware or the software includes one or more modules corresponding to the foregoing function. For example, the sending unit may be replaced by a transmitter, and the receiving unit may be replaced by a receiver, to separately perform sending and receiving operations and related processing operations in the method embodiments. The sending unit and the receiving unit may be collectively referred to as a transceiver unit, and correspondingly the receiver and the transmitter may be collectively referred to as a transceiver. It should be understood that the processing unit in the foregoing embodiments may be implemented by using a processor or a processor-related circuit, and the receiving unit and the sending unit may be implemented by using a transceiver, a transceiver-related circuit, or an interface circuit.

Optionally, the apparatus in the foregoing possible designs may further include a storage unit. The storage unit is configured to store a computer program, and the processing unit may invoke the computer program from the storage unit and run the computer program, to enable the apparatus 500 to perform the method performed by the first access network device in the foregoing method embodiments, to enable the apparatus 600 to perform the method performed by the core network device in the foregoing method embodiments, or to enable the apparatus 700 to perform the method performed by the second access network device in the foregoing method embodiments.

The units in the foregoing embodiments may also be referred to as modules, circuits, components, or the like.

Figure 8:
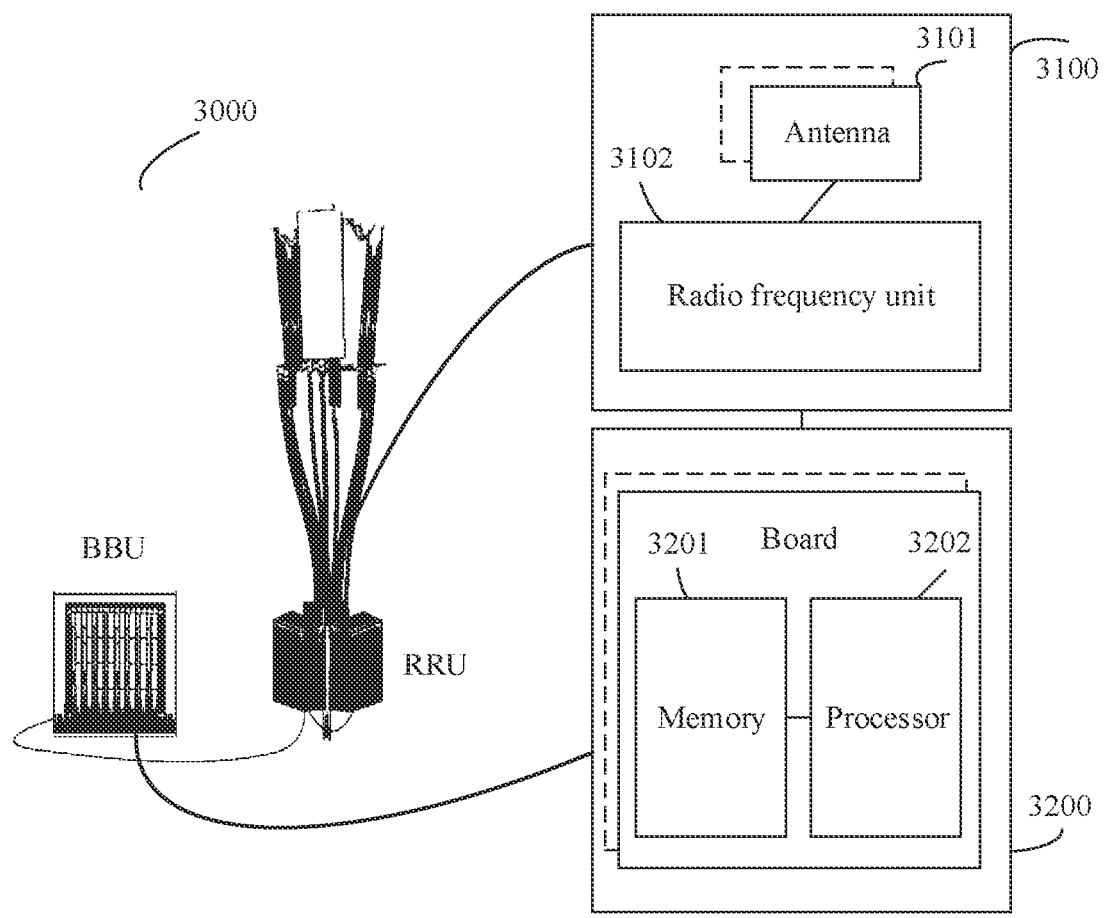
FIG. 8 is a schematic diagram of a structure of a network device according to an embodiment of this application.

FIG. 8 is a schematic diagram of a structure of a network device 3000 according to an embodiment of this application. For example, the network device 3000 may be a schematic diagram of a structure of an access network device, or the network device 3000 may be a schematic diagram of a structure of a core network device. The network device 3000 may be used in the communication system shown in FIG. 1, to implement steps or procedures performed by the first access network device in the foregoing method embodiments, to implement steps or procedures performed by the core network device in the foregoing method embodiments, or to implement steps or procedures performed by the second access network device in the foregoing method embodiments. Details are not described herein again.

As shown in the figure, the network device 3000 may include one or more radio frequency units, for example, a remote radio unit (RRU) 3100 and one or more baseband units (BBUs) 3200. The BBU 3200 may also be referred to as a digital unit (DU). The RRU 3100 may be referred to as a transceiver unit, and corresponds to the receiving unit and the sending unit in FIG. 5 to FIG. 7. Optionally, the RRU 3100 may also be referred to as a transceiver, a transceiver circuit, a transceiver, or the like, and may include at least one antenna 3101 and a radio frequency unit 3102. Optionally, the RRU 3100 may include a receiving unit and a sending unit. The receiving unit may correspond to a receiver (or referred to as a receiver machine or a receiving circuit), and the sending unit may correspond to a transmitter (or referred to as a transmitter machine or a transmitting circuit). The RRU 3100 is mainly configured to: receive and send a radio frequency signal, and perform conversion between the radio frequency signal and a baseband signal. For example, the RRU 3100 is configured to send indication information to a terminal device. The BBU 3200 is mainly configured to: perform baseband processing, control the network device, and the like. The RRU 3100 and the BBU 3200 may be physically disposed together, or may be physically disposed separately, namely, a distributed base station.

The BBU 3200 is a control center of the network device, and may also be referred to as a processing unit. The BBU 3200 may correspond to the processing unit in the foregoing apparatus, and is mainly configured to implement a baseband processing function, such as channel coding, multiplexing, modulation, and spreading. For example, the BBU 3200 may be configured to control the network device to perform an operation procedure related to the first access network device, the second access network device, or the core network device in the foregoing method embodiments, for example, generate the handover condition, or send the handover condition.

In an example, the BBU 3200 may include one or more boards, and a plurality of boards may jointly support a radio access network (such as an LTE network) having a single access standard, or may respectively support radio access networks (such as an LTE network, a 5G network, or another network) having different access standards. The BBU 3200 further includes a memory 3201 and a processor 3202. The memory 3201 is configured to store necessary instructions and data. The processor 3202 is configured to control the network device to perform a necessary action, for example, is configured to control the network device to perform an operation procedure related to the first access network device, the second access network device, or the core network device in the foregoing method embodiments. The memory 3201 and the processor 3202 may serve one or more boards. In other words, the memory and processor can be separately set on each board. Alternatively, a plurality of boards may share a same memory and a same processor. In addition, a necessary circuit may be further disposed on each board.

It should be understood that the network device 3000 shown in FIG. 8 can implement the processes related to the first access network device, the second access network device, or the core network device in the method embodiments in FIG. 2 to FIG. 4. The operations and/or the functions of the modules in the network device 3000 are respectively intended to implement corresponding procedures in the foregoing method embodiments. For details, refer to the descriptions in the foregoing method embodiments. To avoid repetition, detailed descriptions are properly omitted herein.

The BBU 3200 may be configured to perform an action that is implemented inside the first access network device, the second access network device, or the core network device and that is described in the foregoing method embodiments, and the RRU 3100 may be configured to perform an action of sending to the terminal device or receiving from the terminal device that is performed by the first access network device, the second access network device, or the core network device and that is described in the foregoing method embodiments. For details, refer to the descriptions in the foregoing method embodiments. Details are not described herein again.

An embodiment of this application further provides a processing apparatus, including a processor and an interface. The processor may be configured to perform the method in the foregoing method embodiments.

It should be understood that, the processing apparatus may be a chip. For example, the processing apparatus may be a field programmable gate array (FPGA), an application-specific integrated circuit (ASIC), a system on chip (SoC), a central processing unit (CPU), a network processor (NP), a digital signal processing circuit (digital signal processor, DSP), a micro controller unit (MCU), a programmable logic device (PLD), or another integrated chip.

In an implementation process, steps in the foregoing method may be implemented by using a hardware integrated logic circuit in the processor or an instruction in a form of software. The steps of the methods disclosed with reference to embodiments of this application may be directly presented as being performed and completed by a hardware processor, or performed and completed by a combination of hardware and a software module in a processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing method in combination with hardware of the processor. To avoid repetition, details are not described herein again.

It should be noted that the processor in this embodiment of this application may be an integrated circuit chip and has a signal processing capability. In an implementation process, steps in the foregoing method embodiments may be implemented by using a hardware integrated logic circuit in the processor or an instruction in a form of software. The foregoing processor may be a general purpose processor, a digital signal processor (DSP), an application-specific integrated circuit (ASIC), a field programmable gate array (FPGA) or another programmable logic device, a discrete gate or a transistor logic device, or a discrete hardware component. The methods, the steps, and logic block diagrams that are disclosed in embodiments of this application may be implemented or performed. The general purpose processor may be a microprocessor, or the processor may be any conventional processor or the like. The steps of the methods disclosed with reference to embodiments of this application may be directly presented as being performed and completed by a hardware decoding processor, or performed and completed by a combination of hardware and a software module in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing method in combination with hardware of the processor.

It may be understood that, in embodiments of this application, the memory may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct Rambus dynamic random access memory (direct Rambus DRAM, DR DRAM). It should be noted that memories in the system and method described in this specification include but are not limited to the memories and memories of any other proper types.

According to the methods provided in embodiments of this application, this application further provides a computer program product. The computer program product includes computer program code. When the computer program code is run on a computer, the computer is enabled to perform the method corresponding to any network element in any one of the foregoing embodiments.

According to the methods provided in embodiments of this application, this application further provides a computer-readable medium. The computer-readable medium stores program code. When the program code is run on a computer, the computer is enabled to perform the method corresponding to any network element in any one of embodiments shown in FIG. 2 to FIG. 4.

According to the methods provided in embodiments of this application, this application further provides a system, including the foregoing one or more terminal devices, one or more access network devices, and one or more core network devices.

All or some of the foregoing embodiments may be implemented through software, hardware, firmware, or any combination thereof. When software is used to implement embodiments, embodiments may be implemented completely or partially in a form of a computer program product. The computer program product includes one or more computer instructions. When the computer instructions are loaded and executed on the computer, the procedure or functions according to embodiments of this application are all or partially generated. The computer may be a general purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network device and the terminal device in the foregoing apparatus embodiments correspond to the network device or the terminal device in the method embodiments. A corresponding module or unit performs a corresponding step. For example, a communication unit (a transceiver) performs a receiving step or a sending step in the method embodiments, and another step other than the sending step and the receiving step may be performed by a processing unit (a processor). For a function of a specific unit, refer to a corresponding method embodiment. There may be one or more processors.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As illustrated by using the figures, both a computing device and an application that runs on the computing device may be components. One or more components may reside within a process and/or an execution thread, and a component may be located on one computer and/or distributed between two or more computers. In addition, these components may be executed from various computer-readable media that store various data structures. The components may communicate, by using a local and/or remote process and based on, for example, a signal having one or more data packets (for example, data from components in a local system, in a distributed system, and/or across a network).

In this application, "at least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. The character "/" usually indicates an "or" relationship between the associated objects. "At least one of the following items (pieces)" or a similar expression thereof means any combination of these items, including any combination of singular items (pieces) or plural items (pieces). For example, at least one of a, b, or c may indicate a, b, c, a and b, a and c, b and c, or a, b, and c, where a, b, and c may be singular or plural.

A person of ordinary skill in the art may be aware that, various illustrative logical blocks and steps that are described with reference to embodiments disclosed in this specification may be implemented by using electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, function units in embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the method described in embodiments of this application. The storage medium includes any medium that can store program code such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
sending, by a first access network device, a first message to a terminal device, wherein the first message is used to indicate the terminal device to enter an inactive state;
sending, by the first access network device, a second message to a core network device, wherein the second message carries context information and a first security verification parameter of the terminal device, and the first security verification parameter is used to perform security verification on the terminal device;

receiving, by the first access network device, a third message from a second access network device, wherein the third message is used to request the context information of the terminal device; and sending, by the first access network device, a fourth message to the second access network device, wherein the fourth message is used to indicate that the first access network device is not to provide the second access network device with the context information.

2. The communication method according to claim 1, wherein the fourth message is further used to indicate identification information of the core network device.

3. The communication method according to claim 1, wherein the first access network device stores the context information of the terminal device, and the communication method further comprises:

performing, by the first access network device, security verification on the terminal device based on the first security verification parameter; and the sending, by the first access network device, a fourth message to the second access network device based on the third message comprises:

when the security verification succeeds, and if the first access network device determines not to provide the second access network device with the context information, sending, by the first access network device, the fourth message to the second access network device.

4. The communication method according to claim 1, wherein the third message carries a second security verification parameter of the terminal device, the second security verification parameter is used to perform security verification on the terminal device, and the communication method further comprises:

sending, by the first access network device, a fifth message to the core network device, wherein the fifth message carries the second security verification parameter to update a security verification parameter stored in the core network device.

5. The communication method according to claim 1, wherein, after the sending, by the first access network device, a second message to a core network device, the communication method further comprises:

deleting, by the first access network device, the context information of the terminal device.

6. A first access network device, comprising:

at least one processor; and a memory coupled to the at least one processor, the memory comprising programming instructions that, when executed by the at least one processor, cause the first access network device to:

send a first message to a terminal device, wherein the first message is used to indicate the terminal device to enter an inactive state;

send a second message to a core network device, wherein the second message carries context information and a first security verification parameter of the terminal device, and the first security verification parameter is used to perform security verification on the terminal device;

receive a third message from a second access network device, wherein the third message is used to request the context information of the terminal device; and send a fourth message to the second access network device, wherein the fourth message is used to indicate that the first access network device is not to provide the second access network device with the context information.

7. The first access network device according to claim 6, wherein the fourth message is further used to indicate identification information of the core network device.

8. The first access network device according to claim 6, wherein the first access network device stores the context information of the terminal device, and the programming instructions, when executed by the at least one processor, cause the first access network device to:

perform security verification on the terminal device based on the first security verification parameter; and when the security verification succeeds, and if the first access network device determines not to provide the second access network device with the context information, send the fourth message to the second access network device.

9. The first access network device according to claim 6, wherein the third message carries a second security verification parameter of the terminal device, the second security verification parameter is used to perform security verification on the terminal device, and the programming instructions, when executed by the at least one processor, cause the first access network device to send a fifth message to the core network device, wherein the fifth message carries the second security verification parameter, to update a security verification parameter stored in the core network device.

10. The first access network device according to claim 6, wherein the programming instructions, when executed by the at least one processor, cause the first access network device to:

delete the context information of the terminal device, after sending the second message to the core network device.

11. A core network device, comprising:

at least one processor; and a memory coupled to the at least one processor, the memory comprising programming instructions that, when executed by the at least one processor, cause the core network device to:

receive a second message from a first access network device, wherein the second message carries context information and a first security verification parameter of a terminal device, and the first security verification parameter is used to perform security verification on the terminal device;

store the context information and the first security verification parameter;

receive a sixth message from a second access network device, wherein the sixth message is used to request the context information of the terminal device; and perform security verification on the terminal device based on the second message from the first access network device and the sixth message from the second access network device.

12. The core network device according to claim 11, wherein the programming instructions, when executed by the at least one processor, cause the core network device to:

when the security verification succeeds, send a seventh message to the second access network device, wherein the seventh message carries the context information, or the seventh message is used to indicate that the core network device is not to provide the second access network device with the context information.

13. The core network device according to claim 12, wherein the sixth message carries a second security verification parameter of the terminal device, the second security verification parameter is used to perform security verification on the terminal device, and the programming instructions, when executed by the at least one processor, cause the core network device to update a security verification parameter from the first security verification parameter to the second security verification parameter.

* * * * *